United States Patent Office 3,658,751
Patented Apr. 25, 1972

3,658,751
FRICTION PARTICLE FOR BRAKE LINING
Frank S. Grazen, Melvin L. Buike, and Frank M. Bryzinsky, North Tonawanda, N.Y., assignors to Hooker Chemical Corporation, Niagara Falls, N.Y.
No Drawing. Filed Oct. 30, 1969, Ser. No. 872,753
Int. Cl. C08g 37/18, 51/10
U.S. Cl. 260—38
5 Claims

ABSTRACT OF THE DISCLOSURE

A friction particle, useful in applications where cashew nut shell oil friction particles have been used, may be prepared by the reaction at a temperature from about 225 to about 400 degrees Fahrenheit of a non-oxyalkylated resole with resin selected from the group consisting of an oxyalkylated resole, an alkylated resole, an alkylated novolac, an oxyalkylated novolac, and mixtures thereof until it is insoluble, infusible, and does not soften slightly under mechanical force at temperatures below about 400 degrees Fahrenheit, and has substantially no cohesive or bonding strength.

---

This invention relates to novel cured phenolic resins to be used as a friction particle material. It is especially useful where cashew nut shell oil friction particles, called "Cardolite," have been used in the past.

Phenol aldehyde, or hydroxy aromatic-aldehyde condensation products having methylol side or end groups are known in the art as "resoles." They are formed from condensing a phenol with an excess of aldehyde and with an alkaline catalyst, also known as "one-stage" resins and are of the thermosetting type. Except when oxyalkylated, they are self-setting. That is, upon the application of heat there results the formation of a "resite," which is an infusible three-dimensional polymer.

Novolac phenol aldehyde resins, on the other hand, are phenol-ended chain polymers. They are formed by the reaction of an aldehyde with an excess of phenol in the presence of an acid catalyst and/or heat. They are thermoplastic, permanently soluble and fusible. However, upon the addition of a curing agent, they can be cured into an insoluble, infusible resin. Thus, novolac resins are known as "two-stage" resins.

Phenol aldehyde condensation products have been used as binders for abrasive materials. However, to our knowledge, the novel cured phenol aldehyde products of this invention have not been used as a friction particle per se.

As used herein "friction particle" is intended to mean having the properties of substantially no softening at elevated temperatures and will not flow together or cohere with other particles, as a "friction binder" would, or fuse with like friction particles. It is insoluble, having an acetone extraction of less than 35 percent and often less than 5 percent; it is infusible, i.e., has gone beyond the B stage, to the C stage. It will not melt at 700 degrees Fahrenheit. A friction particle is held in place with a friction binder.

As used herein, a "friction binder" has the properties of flowability, and has adhesive and cohesive bonding action and thereby binds together the asbestos and other additives (including a friction particle) necessary for building a brake lining or other similar article of manufacture. The binder, as supplied to the industry, will melt as a dry powder or is a liquid resin, and can be either an A stage or B stage resin. The binder becomes a C stage resin after it is combined with the other ingredients and cured.

This composition of the binder, friction particle and other additives, is heated to about 300–400 degrees Fahrenheit and pressed at about 500–2000 pounds per square inch in order to form a brake lining composition, or clutch facing or other braking device. Thus, the friction particle is substantially insoluble and infusible, softening only at elevated temperatures (i.e., above about 400–500 degrees Fahrenheit).

It has now been found that a composition of matter useful as a friction particle can be prepared by the reaction at a temperature from about 225 to about 400 degrees Fahrenheit of a non-oxyalkylated hydroxy aromatic hydrocarbon-aldehyde resole with a resin selected from the group consisting of an oxyalkylated hydroxy aromatic hydrocarbon-aldehyde resole, an alkylated hydroxy aromatic hydrocarbon-aldehyde resole, an alkylated hydroxy aromatic hydrocarbon-aldehyde novolac, an oxyalkylated hydroxy aromatic hydrocarbon-aldehyde novolac, and mixtures thereof, until it is insoluble, infusible, and does not soften slightly under mechanical force, such as a spatula, at temperatures below about 400 degrees Fahrenheit, and has substantially no cohesive or bonding action or strength. The crude material is initially in lump form, which is then ground to the size specification of the customer. The first said resole can be alkylated but not oxyalkylated. Among the preferred embodiments of this invention are the following:

(1) The reaction product of between about 5 and about 40 percent by weight of an oxyalkylated resole with between about 95 and about 60 percent by weight of one or more of (a) one or more non-oxyalkylated, non-alkylated resoles,
(b) an alkylated resole,
(c) a mixture of a non-oxyalkylated alkylated resole and a non-oxyalkylated, non-alkylated resole,
(d) a mixture of a non-oxyalkylated, non-alkylated resole and a non-oxyalkylated alkylated novolac, and
(e) a mixture of a non-oxyalkylated, non-alkylated novolac and a non-oxyalkylated, non-alkylated resole.

(2) The reaction product of between about 95 and about 60 percent by weight of a non-oxyalkylated, non-alkylated resole with between about 5 and about 40 percent by weight of one or more of:

(a) an oxyalkylated novolac, and
(b) a non-oxyalkylated, alkylated resole.

(3) The reaction product of between about 5 and about 40 percent by weight of an oxyalkylated novolac with between about 95 and about 60 percent by weight of one or more of:

(a) two or more non-oxyalkylated, non-alkylated resoles,
(b) an alkylated resole.
(c) a mixture of an alkylated resole and a non-oxyalkylated, non-alkylated resole,
(d) a mixture of a non-oxyalkylated, non-alkylated resole and a non-oxyalkylated alkylated novolac, and
(e) a mixture of a non-oxyalkylated, non-alkylated resole and a non-oxyalkylated, non-alkylated novolac.

(4) The reaction product of between about 5 and about 95 percent by weight of a solid, B-stage non-oxyalkylated, alkylated resole, with between about 95 and about 5 percent by weight of a liquid, A-stage, non-oxyalkylated, alkylated resole.

(5) The reaction product of between about 70 and about 90 percent by weight of a non-oxyalkylated, alkylated resole, with between about 30 and about 10 percent by weight of a non-oxyalkylated, alkylated novolac.

(6) The reaction product of between about 5 and about 50 percent by weight of a non-oxyalkylated, alkylated resole, with between about 5 and about 30 percent by weight of a non-oxyalkylated, alkylated novolac, and with between about 25 and about 90 percent by weight of a non-oxyalkylated, non-alkylated resole.

In general, an oxyalkylated aromatic material, whether it is a novolac or a resole, will not react with a novolac by itself. The methylol groups on a resole are believed to be needed to react with the polyol groups of the oxyalkylated materials.

The friction particle is formed by blending and reacting the resole with the novolac, or oxyalkylated resole. Usually, the resole and oxyalkylated resole or oxyalkylated novolac are both liquids, so blending is easily achieved. However, when one is a solid, it is powdered and mixed with the liquid. When both are solids, both are dry blended such as by ball milling together. Then they are mechanically blended, such as by being passed through a hammer mill equipped with a quarter mesh screen.

Following blending, the resins are heated to about 225 degrees Fahrenheit to about 400 degrees Farhenheit, and preferably from about 325 degrees Fahrenheit to about 375 degrees Fahrenheit, until a resin of friction particle consistency is formed.

Examples of phenols which can be used in preparing a phenol aldehyde resole or novolac for use in practicing the invention include ortho-, para- directing hydroxy or amino aromatic compounds having 6 to 24 carbon atoms such as phenol itself ($C_6H_5OH$), naphthol, anthranol and substituted derivatives thereof where the substituents on the aromatic compound are independently selected from H, Cl, Br, F, $NH_2$ and (a) Alkyl groups or radicals of 1 to 60 carbon atoms, preferably of 1 to 30 carbon atoms, and their various isometric forms and substituted on the aromatic nucleus in the ortho or para position;

(b) Cycloalkyl groups of 5 to 12 carbon atoms such as cyclohexyl, cyclopentyl, methylcyclohexyl, butlycyclohexyl, and so forth;

(c) Alkyl, aryl and cycloalkyl ketonic groups wherein the hydrocarbon portion is as defined above in (a) and (b);

(d) Alkyl, aryl and cycloalkyl carboxylic groups wherein the hydrocarbon part is defined as above in (a) and (b);

(e) Aryl groups of 6 to 24 carbon atoms such as phenyl, naphthyl, anthryl, and the like;

(f) Aryl substituted alkyl wherein the aryl is phenyl which may contain lower alkyl and/or hydroxy substituents so that the resulting hydroxy aromatic is, for example, a bisphenol; and (g) Mixtures of the aforesaid hydroxy aromatics.

Suitable substituted phenols include the following: para-phenyl phenol, para-benzyl phenol, para-beta-naphthyl phenol, cetyl phenol, para-cumyl-phenol, para-tert-butyl phenol, sec-butyl phenol, para-tert-amyl phenol, para-tert-hexyl phenol, para-alpha-naphthyl phenol, para-hydroxyacetophenone, para-hydroxybenzophenone, para-isooctyl phenol, para-tert-octyl phenol, para-cyclohexyl phenol, para-d-limonene phenol, para-1-limonene phenol, a phenol alkylated with oleic acid, such as phenol alkylated with oleic acid, para-decyl phenol, para-dodecyl phenol, para-tert-decyl phenol, butyl naphthol, amyl anthranol, para-nonyl phenol, para-methyl phenol, bisphenols such as para,para'-isopropylidene diphenol, para, para'-methylene diphenol, as well as the corresponding ortho-derivatives of the previously mentioned compounds such as ortho-butyl phenol and ortho-nonyl phenol as well as mixtures thereof, and aniline.

Mixtures of various hydroxy aromatic compounds mentioned herein also may be used.

Included among the phenolic reactants which may be used are those known as the "cresylic acids" and these often comprise a heterogeneous mixture of having two reacting hydrogen positions on each of them; that is, compounds unsubstituted in the ortho- and para-positions of the molecule, to compounds that only have one functional position, and hence, realtively unreactive. These compounds may include the following: 3,5-xylenol, m-cresol, 3,4-xylenol, 2,5-xylenol, 2,3-xylenol, phenol, p-cresol, ortho-cresol, 2,4-xylenol, and 2,6-xylenol. Crescylic acids or tar acids are generally applied to phenol and its homologs which may include cresols, xylenols, trimethyl phenols, ethyl phenols, and higher boiling materials such as dihydroxy phenols, polycyclic phenols and the like. They are often obtained by a low-temperature trimerization of coal, lignite, and the like, or a conventional high-temperature coke oven tar, or the liquid product of petroleum cracking both thermo and catalytic, shell oil, coal hydric hydrogenation products, and the like.

Polyhydroxy aromatic reactants, such as resorcinol, may also be used.

Particularly useful in this invention are mixtures of aniline and phenol to react with an aldehyde or ketone to produce either a novolac or a resole, depending on the other conditions described above.

Also useful in the invention are mixtures of urea and phenol to react with the aldehyde or ketone to produce either a novolac or a resole depending on the other conditions described above.

Among the aldehydes which may be used within the scope of this invention to produce either the resole or the novolac, are formaldehyde or any of its variations, such as 37 percent formalin concentration or para-aldehyde, acetaldehyde, propionaldehyde, isobutylaldehyde, isopentaldehyde, and the like. The aldehyde should have not more than 8 carbon atoms and should not detrimentally affect the resinification or oxyalkylation of the resin. Preferred aldehydes are those having from 1 to 4 carbon atoms, such as formaldehyde, which may be in aqueous solution (37 percent), or in any of its low polymeric forms such as paraform or trioxane. Other aldehydes include para-aldehydes, furfural, 2-ethyl-hexanal, ethylbutyraldehyde, heptaldyde and glyoxal, benzaldehyde and crotonaldehyde.

Novolacs

To prepare a novolac, the proportion of aldehyde to be condensed with the hydroxy aromatic compound may be varied in order to obtain different molecular weights, and the viscosity of the finished resin may be controlled by the mole weight of the novolac; preferably the proportion of aldehyde employed is from 0.5 to 1.0 per mole of the hydroxy aromatic compound.

Among the substituted phenols which may be used to prepare the novolacs for this invention are those substituted with long-chain ethylenically unsaturated hydrocarbons, such as the linseed-type oils. However, it it within the scope of this invention to employ any animal and/or vegetable oil which achieves the objects of this invention based on the similarity in properties with the long-chain hydrocarbon oils. Such oils would be positioned on the phenol in the ortho- or para- positions, and preferably in the para- position. Many of them are similar in properties to linseed oil having non-conjugated unsaturation of at least 50 iodine number, and have sufficient compatibility with the novolac after it is polymerized. Safflower oil is typical of these oils. It may be in the form of a glycerol ester of the fatty acids wherein the fatty acids are of a composition comprising more than 40 percent by weight of linolenic acid. The remaining percentages of fatty acid can be any saturated or ethylenically unsaturated fatty acid having 12 to 22 carbon atoms and more preferably oleic and linolenic acid so that the fatty esters have an iodine number of at least 50. The iodine value (iodine number) is a measure of unsaturation, and is defined as the number of grams of iodine required per 100 grams of unsaturated material to obtain the saturated material. In addition to the preferred glycerol ester, other polyhydric alcohols can be reacted with the described fatty acids to produce a low acid number ester of a polyol having 2 or more hydroxyl groups. Typical polyols include ethylene glycol, diethylene glycol, pentaerythritol, dipentaerythritol, sorbitol and the other polyhydric alcohols.

The acid catalyst to be used when preparing the novolacs to be used in this invention may be chosen from oxalic acid, sulfuric acid, hydrochloric acid and other strong acids used in the art for preparing novolacs. In addition, wetting agents of the anionic type, such as sodium alkylaryl sulfonates, are also useful as secondary catalysts in preparing novolacs.

The two-stage resins are curable by reaction with hexamethylene tetramine to form dibenzyl and tribenzyl amines, as well as hexatriphenol. One may also use ammonium hydroxide, which reacts with the formaldehyde to form hexamethylene tetramine. Other amines may also be used, such as ethylene diamine or ethylene triamine, or methylamines, etc. These can be used to react with formaldehyde to form a composition similar to hexamethylene tetramine. The resulting compound would be an aldehyde donor.

The phenol aldehyde novolac type resin is prepared by charging the desired phenol and aldehyde raw materials and catalysts to a reaction vessel. The reaction begins at about 100 degrees centigrade and proceeds under temperatures up to about 200 degrees centigrade, at any pressure up to about 100 lbs./square inch gauge for about one and one-half hours, or until the desired degree of polymerization has taken place. Thereafter, the catalyst is neutralized where necessary, and the excess reactant, water, and other materials are taken off by dehydration and the molten resin is discharged from the vessel. It has been found that a novolac which has not been neutralized and is stable will cure more rapidly with a resole than a novolac which has been neutralized.

From the foregoing, it is apparent that many hydroxy aromatic compounds may be used in practicing the present invention to provide a novolac which can be then reacted with an hydroxy aromatic aldehyde resole to form the friction particle of this invention, provided the aromatic hydroxyl group is reactive and the hydroxy aromatic compound is capable of reacting with an aldehyde or a mixture of aldehydes to produce a novolac condensate. Pure, refined phenols may be used, but this is not necessary. For instance, phenols may be alkylated and then may be reacted in crude form with an aldehyde. In such crude form, the phenols may contain some polyalkylated, as well as non-alkylated, phenols.

The process for alkylation of a phenol is well-known in the art. First, dehydration (of water) is carried out with vacuum at elevated temperatures, for instance, between about 100 and about 150 degrees centigrade under a vacuum of between about 20 and about 30 inches of mercury. Then, the dehydrated phenolic material is acidified to a pH of between about 1 and about 5 with $H_2SO_4$ or in some cases $BF_3$. Following this, a terpene or vegetable oil is added and a reaction mixture heated to between about 80 and about 140 degrees centigrade at atmospheric pressure. The molar ratio of reactants is between about 0.1 mole of terpene or vegetable oil per mole of phenol to about 2.5 mole of terpene or vegetable oil per mole of phenol. When tung oil is employed as a vegetable oil in the alkylation, use of $BF_3$ to acidify would cause gelation, so it is not used, but $H_2SO_4$ can be used.

The proportion of aldehyde to be condensed with the hydroxy aromatic compound to form a precondensate may be varied to prepare novolacs of different molecular weights. Viscosity of the finished precondensate may be controlled by the mole weight of the novolac. Preferably, the proportion of aldehyde employed varies from about 0.5 to 1.0 mole per mole of phenol when a mono- or difunctional phenol is used. In instances where a trifunctional phenol is used, i.e., unsubstituted in the ortho- and para-positions, a preferred upper limit of the aldehyde may be about 0.70 mole of aldehyde per mole of phenol so as to minimize the formation of insoluble, infusible condensates. It is preferred that the aldehyde and phenol be condensed using an acid catalyst to shorten the time required for complete condensation of the reactants. Suitable acid catalysts include sulfuric acid, hydrochloric acid, and oxalic acid. These catalysts are generally employed in the amount of 0.1 to about 5 percent by weight of phenol to be condensed.

Where a mixed aldehyde, phenol-aldehyde precondensate is to be prepared, it is formulated by charging the desired phenol and aldehyde raw materials and catalysts to a reaction vessel. The reaction proceeds under temperatures from about 25 to about 150 degrees centigrade at a pressure from about ambient up to about 100 pounds per square inch gauge pressure for a period of time from about 5 minutes to about 5 hours, a suitable time being about one and one-half hours, or until the desired degree of condensation has taken place. The phenol is first reacted with the longer-chain aldehyde to form a phenol-longer chain aldehyde precondensate, followed by a second-step reaction of the phenol-longer chain aldehyde precondensate with formaldehyde to form a thermosettable phenol aldehyde precondensate material. In the second step, the reactants are refluxed at atmospheric pressure, although higher reflux temperatures up to about 150 degrees centigrade can be used by employing elevated pressure. The formaldehyde can be added all at once in the second step, or added gradually. If the formaldehyde is added all at once, then a temperature range between about 50 and about 60 degrees centigrade is used at the beginning of the second-step reaction, until the exothermic reaction subsides, and then the temperature is increased slowly to between about 70 and about 80 degrees centigrade and held until further exothermic reaction subsides, and then the reaction mixture is heated to reflux temperature which is about 100 degrees centigrade at atmospheric pressure. If elevated pressure is used, then the reflux temperature can be increased to as high as about 140 degrees centigrade. If the formaldehyde is added gradually in the second step, then a temperature range between about 95 and about 140 degrees centigrade can be used. The catalyst is then neutralized and the excess reactant, water and other materials are taken off.

While the precondensate is still at an elevated temperature, from about 25 degrees to about 150 degrees centigrade, but below the boiling point of the resultant solution or suspension, with about 100 degrees centigrade being very suitable, it may be reduced in viscosity by addition of suitable solvent. The amount of solvent may vary from about 10 to 70 percent of the precondensate by weight and a suitable ratio of precondensate to solvent is about 10 parts of precondensate to 9 parts of solvent. The controlling factor is the resulting viscosity of the precondensate prepared, rather than the actual volume of solvent charged. Among the solvents which may be used for this purpose are ethanol, methanol, toluene, xylene, ketones, such as acetone, and methylethyl ketone, and mixtures of aromatic and aliphatic hydrocarbons, such as mixtures of benzene and mineral spirits, or benzene and acetone.

Oxyalkylation

Oxyalkylated resins are prepared which preferably contain substantially no free reactive hydroxy aromatic groups, for example, less than about 0.5 percent of the aromatic hydroxy present originally in the hydroxy aromatic or hydroxy aromatic aldehyde condensate. To remove the aromatic hydroxys, the hydroxy aromatic aldehyde resin can be reacted with a compound which etherifies the aromatic hydroxyl groups so that almost all of the aromatic hydroxy groups present in each hydroxy aromatic aldehyde condensate unit are so reacted.

The preferred method of hydroxyalkylation is by reaction with compounds containing a mono-oxirane ring. Such compounds include ethylene oxide, propylene oxide, butylene oxide, styrene oxide and cyclohexene oxide, glycidol and epichlorohydrin. Many other monoepoxides can be used, but the alkylene oxides containing not more than 6 carbons are generally preferred. Additional useful compounds are phenyl glycidyl ether and related compounds prepared from the reaction of epichlorohydrin and monofunctional alkylated and halogenated phenols such as pentachlorophenyl glycidyl ether.

Catalysts for the reaction of the oxirane ring compounds and phenolic hydroxy groups may be alkali or alkaline earth hydroxides, primary amines, secondary amines, tertiary amines or basic alkali salts. These include sodium, potassium, lithium, calcium and barium hydroxides, amines such as methyl, dimethyl, diethyl, trimethyl, triethyl, tripropyl, dimethyl benzyl, dimethyl hydroxyethyl, dimethyl-2-hydroxypropyl and the like, and salts of strong bases and weak acids such as sodium acetate and benzoate.

The reaction may be carried out at temperatures of about room temperature of 250 degrees centigrade, and preferably in the absence of solvents, although solvents may be used to reduce viscosity when desired. When oxyalkylating resoles, the reaction should be carried out at lower temperatures than when oxyalkylating novolacs, because there is a possibility that reaction of the methylol group with other methylol groups gives methylene linkages, formaldehyde and gelation. When oxyalkylating a novolac, temperatures between room temperature and about 200 degrees centigrade can be used. When oxyalkylating a resole, temperatures between room temperature and about 100 degrees centigrade may be used.

The aromatic hydroxy of the novolacs may also be hydroxyalkylated by reacting alkylene halohydrins with the aromatic hydroxyl using equivalent amounts of an alkali metal hydroxide to bring about the reaction. Suitable alkylene halohydrins are ethylene chloro- and bromohydrins, propylene chloro- and bromohydrins, 2,3-butylene chloro- and bromohydrins, and glyceryl chloro- and bromohydrins.

Another method for hydroxyalkylating novolacs is reaction with alkylene carbonates such as ethylene carbonate and propylene carbonate, using a catalyst such as potassium carbonate.

At least one mole of alkylene oxide or other etherifying or esterifying agent is required per mole of aromatic hydroxyl. However, resins prepared by reaction with up to 7 moles of alkylene oxides per mole of phenolic hydroxyl have been found to be useful.

Resoles

The liquid one-stage resin (resole) which forms a part of this invention may be formed by reacting an hydroxy aromatic compound with an excess of formaldehyde in alkali such as sodium hydroxide dissolved in water. The reaction mixture is gradually heated to reflux and held at reflux until less than about 1 percent of free formaldehyde remains. This provides a preferred reaction product which has less than 2 percent of the formaldehyde unreacted, although this is not critical in this process. Less than 2 percent free $CH_2O$ is desirable. The reaction mixture is then cooled and the catalyst neutralized with some acid such as glacial acetic acid and the pH is adjusted to roughly 6 to 7.5. The reaction mixture may be then further reacted with hexamethylene tetramine or some other aldehyde donor, i.e., curing agent. The resin is then dehydrated to between about 50 to 95 percent solids, and preferably between about 81 and 85 percent solids.

The alkyline catalyst used in preparing the resoles to be used in this invention may be any of those known in the art; for instance, sodium hydroxide and calcium hydroxide. In general, the alkali metal hydroxides and the alkaline earth metal hydroxides and ammonium hydroxide and the amines such as triethanol amines may be used.

Following the intercondensation reaction to form a resole, a stoichiometric quantity of a strong acid such as sulfuric acid, hydrochloric acid, phosphoric acid or oxalic acid, or the like, is added to the reaction mixture in order to neutralize the alkaline condensation catalyst. Sulfuric acid is conveniently employed to neutralize a sodium hydroxide catalyst. The alkaline catalyst may also be neutralized by dilution through repeated washing, however, it is preferred to use an acid. The final resin should have a pH between about 5.5 and 7.5 for good stability.

The hydroxy aromatic compound employed in a resole can be alkylated, if desired, with alkyl groups containing 1 to 12 carbon atoms, or with unsaturated groups, including the long-chain unsaturated vegetable or animal oils, to form alkylated hydroxy aromatic compounds that when reacted with an aldehyde form "heat reactive" resoles. These include alkylene groups of 2 to 36 carbon atoms, fatty acids, polyethers, alkyl ethers, polyesters and polyols and mixtures of these.

Among the high molecular weight or polymeric materials containing aliphatic carbon-to-carbon unsaturation, there are included such naturally occurring materials as unsaturated vegetable, fish or animal oils such as linseed, soya, tung, sesame, sunflower, cotton seed, herring, menhaden, and sardine oils, etc., or chemically modified naturally occurring materials such as allyl ethers of starch, cellulose or acrylate esters thereof, etc., synthetic drying oils, polymers obtained by polyetherification of such unsaturated compounds such as maleic, fumaric, itaconic, aconitic, chloromaleic, dimerized fatty acids, anhydrides or acids from allyl glycerol, methallyl glycerol ether, glycerol monoacrylate, butene diol, pentene diol, or polymers obtained by polyetherification of the unsaturated polyols. Other oils include castor oil, tall oil, oiticica oil, safflower oil, and the like, oleic and linolenic acids. These fatty acids have from 12 to 22 carbon atoms. They are often in combination as a glycerol ester or in combination with other polyhydric alcohols or polyols such as ethylene glycol, diethylene glycol, pentaerythritol, dipentaaerythritol, sorbitol, and the like polyhydric alcohols.

The blending and reacting of the resole with the other components in accordance with this invention may be in various proportions, depending upon the ultimate properties desired in the friction particle to be produced, but will generally be in the range of about 60 to about 95 weight percent of the non-oxyalkylated resole based on the total weight of resin components.

It is to be understood that the oxyalkylated resole or oxyalkylated novolac described herein will not be a friction particle alone unless reacted with a non-oxyalkylated, non-alkylated resole resin or with a non-oxyalkylated, alkylated resole resin. The oxyalkylated resole product is a liquid and will not cure. The preferred compositions of the invention contain at least one of an oxyalkylated resole and an oxyalkylated novolac in combination with the non-oxyalkylated resole.

The friction particle of this invention may be used alone or with other friction materials known in the art. A typical friction element contains about 30 to 60 weight percent asbestos fiber, up to 40 weight percent other inorganic filler and abrasives, about 5 to 15 weight percent organic filler, including the particle of this invention, and about 15 to 30 weight percent binder; all percents are by weight of total composition. Asbestos fiber, other abrasive materials and filler materials are charged into a mixer followed by the addition of a binder, such as a varnish material. The materials are kneaded until the fiber, abrasives, and any fillers are thoroughly wetted and a uniform mass is obtained. The mass is discharged from the mixer, rolled out into sheets or extruded or pressure molded and dried, after which it is ready for further processing into friction elements.

The abrasives, that is, the friction imparting agents and fillers, which may be used in addition to the abrasive material disclosed and claimed herein, within the scope of this invention include, but are not limited to brass chips, metal shavings and fillings, silica, talc, wood flour, chalk, clay, mica, fiber glass, felt, carbon black, graphite, metal nitrides and oxides, and ground cashew nut shell oil polymerizate. These abrasives and fillers may be used in addition to the friction particle of this invention to achieve the particular amount of bulk and coefficient of friction desired. Some consumer specifications specify that the friction particle should be 90 percent finer than 20 mesh and coarser than 100 mesh. Other consumer specifications call for coarser or finer friction particles.

The following examples are given to further illustrate the invention. Unless otherwise indicated, all parts are by weight and temperatures in degrees centigrade.

EXAMPLE 1

Part A (The resole)

A reaction vessel is charged with 100 parts of phenol, 5 parts of cresylic acid, 110 parts of formalin (37 percent formaldehyde) and 1.0 part of flake caustic dissolved in 4 parts of water. This reaction mixture is heated gradually to reflux and held at reflux to less than 5 percent free formaldehyde and cooled to 70 degrees centigrade, after which 1.5 parts of glacial acetic acid is added which neutralizes this composition to a pH of 6.8–7.2. After the pH range is achieved the resin is dehydrated to 81–85 percent solids and cooled to room temperature. The resultant product is a viscous liquid, and is identified as resin Ra in Table V.

Part B (The oxyalkylated novolac)

The oxyalkylated novolac may also be referred to as a polyol of a novolac which is oxyethylated, using from about one mole to about 7 moles of ethylene oxide to 1 mole of phenol, depending on the properties desired. For this example, a resin was used with a ratio of 2 moles of ethylene oxide to one mole of phenol.

A typical modified phenol-aldehyde condensation product is prepared by introducing 3,000 parts phenol, 13 parts of oxalic acid catalyst and 6 parts of a wetting agent of Nacconol (sodium alkylaryl sulfonate) into a jacketed reactor and heating to 100 degrees centigrade. (The anionic wetting agents of alkylaryl sulfonate type are preferred.) Then 1,110 parts of a 37 percent aqueous formaldehyde solution are added to the reactor at a rate that the heat of reaction provides a vigorous reflux. Refluxing is continued for 2 hours after the completion of the formalin addition. The reactor contents are dehydrated at 180 degrees centigrade and then dephenolated at 200 degrees centigrade at 50 millimeters vacuum. Approximately 2,030 parts of phenol-aldehyde condensate are produced. Then 7.2 parts of sodium hydroxide are introduced to the reactor. Ethylene oxide is then added to the reactor as either a vapor or a liquid. The reactor temperature is maintained at 190 degrees centigrade for the initial 2 hours and is then permitted to increase to the range of 200 to 220 degrees centigrade until the addition of 878 parts of ethylene oxide is complete. The resulting condensation product had a hydroxyl number of 370, and a Gardner viscosity at 50 degrees centigrade of about 2,000 seconds, and is resin Nf in Table VI.

The novel friction particle is made by blending 60 parts of Part A with 40 parts of Part B, curing 8–16 hours at 325 to 375 degrees Fahrenheit, grinding to the desired screen size necessary for a friction particle useful in the arts. In this particular example, the blend was cured for 16 hours at 350 degrees Fahrenheit and ground to 20 mesh. The resulting particle was made up into a brake lining, tested by standard procedures and found to be satisfactory for this use.

EXAMPLE 2

70 parts of Part A and 30 parts of Part B of Example 1 were blended and reacted, using the same curing cycle as in Example 1. The resulting product was ground to 20 mesh and found to be superior to a polymerized cashew nut shell oil friction particle known as "Cardolite" in trade, having softening properties at 500 degrees Fahrenheit when compressed slightly with an 8 inch spatula (⅝" wide by 4" long x 1/32" thick blade). Also the heat loss at 700 degrees Fahrenheit was lower than that of Cardolite.

EXAMPLE 3

80 parts of Part A and 20 parts of Part B of Example 1 were blended and reacted, using the same curing cycle as in Example 1. The resulting product was ground to 20 mesh and had properties similar to those of the product of Example 2.

The particles obtained in the above Examples 1, 2 and 3 were superior to friction particles made from polymerized cashew nut shell oil commonly called "Cardolite," presently used as friction particles in the brake lining industry. The particles made in accordance with the invention are less subject to migration of components which results in brake linings with better "fade" characteristics. The particles of the invention are more heat resistant and can be made with more uniform quality, with better control of end properties. The particles are less toxic to the skin than Cardolite, which has the further disadvantage of being solely available from foreign sources. The products of the invention can also be made at lower cost.

EXAMPLE 4

The friction particle (7 parts) of Example 1 was used in formulating a mixture comprising 62.37 parts of dry mix, 0.63 part of hexamethylenetetramine, 16.4 parts of varnish, 20 parts of rubber solvent (mainly mineral spirits) and 0.6 part water. The dry mix is composed of 93 parts by weight of asbestos shorts, Quebec Standard Asbestos Grade 7K, and 7 parts by weight of the friction particles. The moisture content of the dry mix is held low between 0.75 and 1.0 percent to avoid any possibility of blistering of the element during cure.

To an internal mixer equipped with a Sigma-type blade were charged the dry mix and hexamethylenetetramine. The dry materials were mixed and blended for 5 minutes. Then the varnish and toluene were added and mixed for 1 hour until the mass was uniform. The dough-like mix was then discharged from the mixer and charged to an extruder. The extruder is equipped with a 2 inch by ¼ inch rectangular die and has an applied ram pressure of 100 to 300 pounds per square inch. The dough-like mix was then extruded in a shape which was satisfactory for brake linings. The extruded linings were oven dried for 3 hours and with a gradual increase of temperature up to about 88 degrees centigrade to remove solvents and other volatiles. The linings were then cut to proper length, reheated for 2 to 3 minutes at about 163 degrees centigrade, bent or arched to the desired curvature and placed into forms (i.e., molds) for curing. These linings were then cured for 8 hours at about 205 degrees centigrade. The cured linings after cooling were expanded to the proper size for mounting into brake shoes. The resulting friction elements were found to be satisfactory for use on automobile brakes.

EXAMPLES 5–12

In Table I, Examples 5–12 are shown in tabular form. In each of these examples, (except Examples 10, 11 and 12) the resins were weighed into a beaker and mechanically mixed. The mix was spread into aluminum pans (2½ inches by 7 inches) and cured in an air-circulating oven at the specified temperature and time. The formulations for the resoles and novolacs used are given in Tables V and VI, respectively. Example 10 is a repeat of Example 2. In Example 11, a "Cardolite" NC–104–20 sample of cashew nut shell oil friction particles is given for comparison purposes. In Example 12, since both resins are liquids, the materials were mixed in a 15 gallon kettle. In all other respects, however, the procedures and equipment were the same as the other examples in Table I.

TABLE I

| Example number | Resole Weight | Resole Resin formula | Novolac Weight | Novolac Resin formula | Weight ratio Resole/novolac | Cure temp., °C. | Cure time, hrs. | Volatile loss, percent | Acetone extractable percent | Hot plate behavior at 500° F.—Spatula test |
|---|---|---|---|---|---|---|---|---|---|---|
| 5 | 195 | Rc | 15 | Na | 90/10 | 175 | 16 | 11.93 | 2.07 | Smoky, softens slightly under spatula pressure. |
| 6* | 195 | Rc | 15 | Na | 90/10 | 175 | 16 | 14.3 | 3.14 | Do. |
| 7 | 225 | Rf | 15 | Na | 90/10 | 175 | 16 | 22.7 | 13.66 | Very smoky, softens slightly, color change. |
| 8 | 162 | Rc | 45 | Nd | 70/30 | 175 | 16 | 13.6 | 25.61 | Smoky, changes to a wet, oily mass, soft. |
| 9 | 225 | Rf | 15 | Nd | 90/10 | 175 | 16 | 17.9 | 11.52 | Smoky, softens slightly. |
| 10 | 140 | Ra | 60 | Nf | 70/30 | 120 | 16 | 24.9 | 21.65 | Smoky, very slight softening, color change. |
| 11 | Cardolite NC-104-20 Cashew Nut Shell Oil Friction Particles | | | | | | | 25.9 | 2.59 | Very smoky, softens slightly, oily odor, particle breakdown. |
| 12 | 140 | Rg | 60 | Nf | 70/30 | 120 | 22 | 17.27 | 3.63 | Smoky, slight softening, color change. |

*2.4 grams of hexamethylene tetramine were also added into the mix.

NOTE.—Weights are in grams; volatile loss is at 700° F. for one hour; acetone extractable test is ASTM D-494-46; all materials tested were ground through 20 mesh; ratio is of resin solid content.

The results presented in Table I indicate that the commercial Cardolite friction particle has a high volatile loss when heated at 700 degrees Fahrenheit for one hour, a low acetone extractable content and deteriorated when heated to 500 degress Fahrenheit on a hot plate. By contrast, the products of the invention were more stable at elevated temperatures. The results also exhibit the control over properties that is possible with compositions of the invention. Thus, a low acetone extractable content indicates a hard material, a high acetone extractable content indicates a softer material.

EXAMPLES 15–27

In Table II, Examples 15–27 are shown in tabular form. The procedure used is set forth in the footnote of Table II. The formulations for the resoles and novolacs used are given in Tables V and VI, respectively.

TABLE II

| Example number | Resole formulation | Novolac formulation | Ratio resole/novolac | Volatile loss, percent | Acetone extractable, percent | Hot plate behavior at 500° F.—Spatula test |
|---|---|---|---|---|---|---|
| 15 | Rg | | | 7.51 | 0.0 | No smoking or softening. |
| 16 | Ra | | | 6.29 | 0.0 | Do. |
| 17 | Re | Nf | 70/30 | 36.72 | 2.29 | Slight softening, light smoking. |
| 18 | Rc and Rd | Nf | 70/30 | 25.92 | 3.70 | Slight softening, no smoking. |
| 19 | Rg | Ng | 70/30 | 8.17 | 0.03 | No smoking or softening. |
| 20 | Ra | Ng | 70/30 | 10.23 | 1.68 | Slight softening. |
| 21 | Rg | Nh | 80/20 | 7.23 | 0.0 | Do. |
| 22 | Ra | Nh | 80/20 | 7.00 | 0.18 | Do. |
| 23 | Rg | Ne | 70/30 | 6.60 | 0.67 | Slight smoking, no softening. |
| 24 | Rc | Hycar 1561 latex | 90/10 | 9.35 | 0.49 | Very smoky, melts and turns rubbery. |
| 25 | Rb and Rc | Nf | 70/30 | 18.35 | 0.58 | No smoking, no softening. |
| 26 | Rg | Nc | 80/20 | 7.0 | 4.34 | Slight smoking, slight softening. |
| 27 | Ra | Nc | 70/30 | 6.45 | 0.60 | Slight smoking, no softening. |

NOTE.—All components were weighed into a beaker (200 grams total mix) and mechanically mixed. The mix was spread into aluminum pans (2½″ x 7″) and cured in an air circulation oven at 175° C. for 16 hours. Acetone extractable test is ASTM D-494-46; volatile loss is at 700° F. for one hour; All materials tested were ground through 29 mesh.

EXAMPLES 28–46

In Table III, Examples 28–46 are shown in tabular form. They are presented to illustrate the variation in results obtainable from Example 12 (varied in Examples 28–41) and Example 14 (varied in Examples 42–46). Thus, this invention provides a means of producing friction particles of variable properties, thereby permitting more flexibility in the supply of friction particle products to the industry.

TABLE III

Variations on examples 12 and 14 in Table I

| Example number | Resole formulation | Novolac formulation | Ratio | Cure time | Cure temp. | Volatile loss, percent | Acetone extractable, percent | Comments |
|---|---|---|---|---|---|---|---|---|
| 28 | Ra | Nf | 70/30 | 1 hr. | 200° C. | 9.4 | 23.58 | Mixed under vacuum while heating from 85° C. to 105° C. Hot plate cure—59 sec. |
| 29 | Ra | Nf | 70/30 | 16 hrs. | 120° C. | 21.4 | 28.49 | Mixed under vacuum while heating from 85° C. to 105° C. Hot plate cure—72/77 sec. |
| 30 | Ra | Nf | 60/40 | 16 hrs. | 120° C. | 16.96 | 41.8 | Mixed under vacuum while heating from 85° C. to 90° C. Hot plate cure—101/106 sec. |
| 31 | Ra | Nf | 70/30 | 16 hrs. | 120° C. | 14.0 | 24.5 | Mixed under vacuum while heating from 85° C. to 105° C. Hot plate cure—46/51 sec. |
| 32 | Ra | Nf | 70/30 | 2 hrs. | 200° C. | 14.2 | 32.63 | Resins physically mixed. |
| 33 | Ra | Nf | 70/30 | 5 hrs. | 180° C. | 19.7–21.8 | 17.5–22.4 | Hot plate cure—55/60 sec. |
| 34 | Ra | Nf | 70/30 | 4 hrs. | 180° C. | 12.5–15.0 | 22.2–23.8 | |
| 35 | Ra | Nf | 70/30 | 0.1 hr. | 440° C. | 23.5–25.1 | 8.65–12.33 | Resins physically mixed. |
| 36 | Ra | Nf | 70/30 | 0.05 hr. | 440° C. | 27.4 | 15.67 | Do. |
| 37 | Ra | Nf | 70/30 | 5 min. | 600° F. | 23.6 | 19.45 | Do. |
| 38 | Ra | Nf | 70/30 | 6 min. | 600° F. | 24.8 | 17.76 | Do. |
| 39 | Ra | Nf | 70/30 | 7 min. | 600° F. | 25.1 | 17.47 | Do. |
| 40 | Ra | Nf | 70/30 | 8 min. | 600° F. | 24.4 | 15.62 | Do. |
| 41 | Ra | Nf | 70/30 | 10 min. | 600° F. | 24.0 | 15.09 | Do. |
| 42 | Rg | Nf | 70/30 | 3 min. | 600° F. | 22.5 | 5.45 | Do. |
| 43 | Rg | Nf | 70/30 | 2 min. | 600° F. | 23.3 | 10.34 | Do. |
| 44 | Rg | Nf | 70/30 | 4 min. | 600° F. | 22.0 | 7.61 | Do. |
| 45 | Rg | Nf | 70/30 | 5 min. | 600° F. | 21.6 | 7.02 | Do. |
| 46 | Rg | Nf | 70/30 | 8 min. | 600° F. | 21.9 | 4.81 | Do. |

NOTE.—Experiments 28–35 were tested for volatile loss at 600° F. for 2 hours and acetone extractable for 16 hours (ASTM D-494-46); Experiments 36–46 were tested for volatile loss at 700° F. for 1 hour and acetone extractable for 4 hours (ASTM D-494-46).

EXAMPLES 47-62

In Table IV, Examples 47-62 are shown in tabular form. They are presented to further illustrate the variation in resoles and novolacs which can be employed to produce a friction particle. The procedure used was the same as that in Examples 5-9 of Table I.

TABLE IV

| Example Number | Resole formulation | Novolac formulation | Oxyalkylated resin formulation | Ratio | Percent volatile loss | Percent Acetone extractable | Hot plate behavior at 500°F. |
|---|---|---|---|---|---|---|---|
| 47 | Rg | | Rj | 70/30 | 21.19 | 15.83 | Slight smoke, very slight softening. |
| 48 | Rf | | Rj | 70/30 | 31.71 | 0.11 | Smoky, softens, odor, oily appearance, slight caking. |
| 49 | Rg and Rf | | Rj | 35/35/30 | 26.28 | 31.47 | Smoky, slight softening, odor. |
| 50 | Rg and Rh | | Rj | 35/35/30 | 22.77 | 24.05 | Slight smoke, slight softening slight odor. |
| 51 | Rg | Nd | Rj | 15/15/70 | 14.43 | 15.24 | Smoky, softens, odor, oily, cakes. |
| 52 | Rg | Nb | Rj | 70/15/15 | 11.57 | 0.89 | Very slight smoke, very slight softening. |
| 53 | Rg and Rf | | | 60/40 | 10.51 | 0.97 | No smoke, very slight softening. |
| 54 | Rf | | Nf | 80/20 | 20.13 | 32.99 | Smoky, slight softening, odor, oily. |
| 55 | Rg and Rf | | Nf | 40/40/20 | 16.51 | 6.59 | Slight smoke, slight softening. |
| 56 | Rg and Rh | | Nf | 35/35/30 | 17.88 | 13.50 | Slight smoke, very slight softening. |
| 57 | Rg | Nd | Nf | 70/10/20 | 13.67 | 7.30 | Slight smoke, softens, very oily, cakes. |
| 58 | Rg | Nb | Nf | 70/10/20 | 12.26 | 0.32 | No smoke, slight softening. |
| 59 | Rf and Ri | | | 60/40 | 10.92 | 15.96 | Slight smoke, softens, slightly oily, slight caking. |
| 60 | Rf | Nd | | 80/20 | 12.56 | 18.58 | Slight smoke, slight softening, slightly oily. |
| 61 | Rf and Rg | Nd | | 20/70/10 | 9.18 | 7.01 | Smoky, softens, oily, slight caking. |
| 62 | Cardolite NC-104-20 Cashew Nut Shell Oil friction particles | | | | | | Smoky, very slight softening, slight odor. |

TABLE V

| Raw material | a | b | c | d | e | f | g | h | i | j* |
|---|---|---|---|---|---|---|---|---|---|---|
| Acetic acid | 0.18 | | | | 0.04 | | | | | |
| Alcohol | | | | | | | 28.90 | | | |
| Ammoniacal liquor | 0.78 | | | | | | 2.43 | | | |
| Aniline | | 4.86 | | | | | | | | |
| Casein | | | 1.66 | | | | | | | |
| Caustic soda | 0.15 | | 0.38 | | | 0.36 | | 0.17 | 2.14 | |
| Citric acid | | | | | | 0.18 | | | | |
| Deodorant | | | | | | 0.01 | | | | |
| Formaldehyde (37.2%) | 47.36 | 54.41 | 49.44 | 50.74 | 48.44 | 29.00 | 56.91 | 45.09 | 24.45 | 180 |
| Hexamethylene tetramine | 1.18 | | | | | | | | | |
| Lime | | | 0.71 | | | | | 0.81 | | |
| Melamine (buffered) | | | | | 12.31 | | | | | |
| Meta-Para cresol | 1.78 | | | | | | | | | |
| Methanol | | | | | | | | | 1.65 | |
| Ortho cresol | 3.85 | | | | | | | | | |
| Oxalic acid | | | | | | | | 0.24 | 0.02 | |
| Para-tertiary butyl phenol | | | | | | | | | 21.60 | |
| Para-tertiary octyl phenol | | | | | | | 19.93 | | | |
| Phenol | 43.22 | 38.86 | 32.93 | 36.95 | 18.77 | 19.93 | 40.65 | 52.37 | | 100.0 |
| Phosphoric acid | | | | | | | | | | 0.61 |
| Propylene oxide | | | | | | | | | | 121.5 |
| Sulfuric acid | | | | | | | | | 2.76 | |
| Triethylamine | | | | | | | | | | 7.2 |
| Urea (shotted) | | | | | | 7.72 | | | | |
| Urea formaldehyde | | | | | 23.84 | | | | | |
| Water | 1.51 | 1.16 | 15.57 | | 0.63 | | 1.63 | 0.48 | 27.77 | |
| Xylene | | | | | | | | | 21.21 | |

*In Resole Rj, the phenol, formaldehyde and 2.5 parts of triethanolamine were first reacted. This product is then oxypropylated with the remaining specified ingredients.

TABLE VI

Novolac Resin Formulations

| Raw material | a | b | c | d | e | f | g | h |
|---|---|---|---|---|---|---|---|---|
| Ammoniacal liquor | | | | 2.31 | | | | |
| Aniline | | 43.92 | | | | | | |
| Beta naphthol | | | | | | | | 37.80 |
| Butyl acid phosphate | | | | | | 0.02 | | |
| Castor oil | 36.77 | | | | | | | |
| Caustic soda | | | | | | 0.01 | | |
| Ethylene oxide | | | | | | 36.68 | | |
| Formaldehyde (37.2%) | 6.67 | 40.62 | 54.32 | 22.92 | 34.70 | 16.98 | 19.72 | 35.95 |
| Furfural | | | | | 3.30 | | | |
| Isobutyraldehyde | | | | | | | 17.42 | |
| Lime | | | | | 0.14 | | 0.48 | |
| Limonene | 19.19 | | | | | | | |
| Linseed oil | 24.26 | | | | | | | |
| Maleic anhydride | | | | | | 0.02 | | |
| Sodium alkylaryl sulfonate | | 0.01 | | 0.06 | | 0.01 | 0.12 | |
| p-Octyl phenol | | | | 73.95 | | | | |
| Oxalic acid | 0.17 | 0.03 | | 0.74 | | | | 0.53 |
| Stearic acid | | | | | 1.10 | | | |
| Sulphuric acid | 0.08 | | 0.88 | | | | 0.61 | |
| Water | 0.67 | 0.59 | 0.88 | | 0.28 | | 0.96 | 1.06 |
| Xylene | | | | | 5.58 | | | |
| Phenol | 22.16 | 58.45 | | | 54.91 | 45.85 | 60.68 | 24.67 |

We claim:
1. A friction particle consisting essentially of the product of the reaction at about 225 to about 400 degrees Fahrenheit for about 8 to about 16 hours of a non-oxyalkylated hydroxy aromatic-aldehyde resole containing substantially no etherified aromatic hydroxyl groups with a resin selected from the group consisting of at least one of an oxyalkylated hydroxy aromatic hydrocarbon-aldehyde resole, an alkylated hydroxy aromatic hydrocarbon-aldehyde resole, an alkylated hydroxy aromatic hydrocarbon-aldehyde novolac, an oxyalkylated hydroxy aromatic hydrocarbon-aldehyde novolac, until the resulting product is insoluble, infusible and does not soften slightly under mechanical force at a temperature below 400 de- grees Fahrenheit, and has substantially no cohesive or bonding strength, wherein said nonoxyalkylated resole comprises about 60 to about 95 weight percent of the weight of the resin components.

2. The friction particle of claim 1 which consists essentially of about 5 to about 40 percent by weight of an oxyalkylated novolac and about 95 to about 60 percent by weight of more than one non-oxyalkylated, nonalkylate resole having substantially no etherified aromatic hydroxyl groups.

3. A brake lining comprising the cured product of the friction particle of claim 1, a resin binder, and an inorganic filler.

4. A brake lining comprising the cured product of about 30 to 60 weight percent asbestos fiber, up to 40 weight percent other inorganic fillers and abrasives, about 5 to 15 weight percent of the particle of claim 1, and about 15 to 30 weight percent binder.

5. A brake lining comprising the cured product of about 30 to 60 weight percent asbestos fiber, up to 40 weight percent other inorganic fillers and abrasives, about 5 to 15 weight percent of the particle of claim 2, and about 15 to 30 weight percent binder.

References Cited
UNITED STATES PATENTS

| | | | |
|---|---|---|---|
| 2,625,530 | 1/1953 | Doelling et al. | 260—838 |
| 2,626,942 | 1/1953 | De Groote | 260—838 |
| 2,894,931 | 7/1959 | Somerville et al. | 260—838 |
| 2,971,936 | 2/1961 | Dubien et al. | 260—838 |
| 3,177,090 | 4/1965 | Bayes et al. | 260—838 |
| 3,455,868 | 7/1969 | D'Alessandro | 260—838 |

JOHN C. BLEUTGE, Primary Examiner

U.S. Cl. X.R.

260—19 R, 19 A, 39 R, 39 M, 395 B, 51.5, 838, 840, Dig. 39

PO-1050
(5/69)

UNITED STATES PATENT OFFICE
CERTIFICATE OF CORRECTION

Patent No. 3,658,751          Dated April 25, 1972

Inventor(s) Frank S. Grazen, Melvin L. Buike and Frank M. Bryzinsky

It is certified that error appears in the above-identified patent and that said Letters Patent are hereby corrected as shown below:

Column 2, line 35, delete "an" and insert ---a non-oxyalkylated,---. Column 3, line 7, after "oxyalkylated", insert ---hydroxy---; line 36, delete "isometric" and insert ---isomeric---; line 39, delete "butlycyclo-" and insert ---butylcyclo----. Column 4, line 4, delete "realtively" and insert ---relatively---; line 54, delete "it" second occurence, and insert ---is----. Column 7, line 23, delete "of" and insert ---to---; line 35, delete "hydroxy" and insert ---hydroxyl---; line 69, delete "and" and insert ---to---; line 70, delete "alkylene" and insert ---alkaline----. Column 8, line 39, delete "dipentaaerythritol" and insert ---dipentaerythritol----. Column 9, line 2, delete "fillings" and insert ---filings---, Column 10, line 1, after "in" insert ---the----. Table II, Example 17, delete "light" and insert ---slight---; Table II in the Note last line delete "29" and insert ---20----. Table III, Example 29, delete "28.49" and insert ---28.59 ---. Table V for Raw material Urea-formaldehyde the value "23.84" should be under column "e" instead of column "d"; Table V heading, delete "Resin" and insert ---Resole Resin Formulations ---. Claim 1 cancel entire claim and insert the following claim in its place:

1. A friction particle consisting essentially of the product of the reaction at about 225 to about 400 degrees Fahrenheit for about 8 to about 16 hours of about 95 to about 60 percent by weight of a non-oxyalkylated, non-alkylated resole containing substantially no etherified aromatic hydroxyl groups and about 5 to about 40 percent by weight of an oxyalkylated novolac, until the resulting product is insoluble, infusible and does not soften slightly under mechanical force at a temperature below 400 degrees Fahrenheit, and has substantially no cohesive or bonding strength.

Signed and sealed this 29th day of August 1972.

(SEAL)
Attest:

EDWARD M. FLETCHER, JR.
Attesting Officer

ROBERT GOTTSCHALK
Commissioner of Patents